US 9,235,762 B2

(12) United States Patent
Tosa

(10) Patent No.: US 9,235,762 B2
(45) Date of Patent: *Jan. 12, 2016

(54) IRIS DATA EXTRACTION

(71) Applicant: MorphoTrust USA, LLC, Billerica, MA (US)

(72) Inventor: Yasunari Tosa, Arlington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/251,177

(22) Filed: Apr. 11, 2014

(65) Prior Publication Data

US 2014/0205156 A1 Jul. 24, 2014

Related U.S. Application Data

(63) Continuation of application No. 13/723,711, filed on Dec. 21, 2012, now abandoned, which is a continuation of application No. 13/096,401, filed on Apr. 28, 2011, now Pat. No. 8,340,364, which is a continuation of application No. 11/526,096, filed on Sep. 25, 2006, now Pat. No. 7,970,179.

(51) Int. Cl.
*G06K 9/00* (2006.01)

(52) U.S. Cl.
CPC .......... *G06K 9/00597* (2013.01); *G06K 9/0061* (2013.01)

(58) Field of Classification Search
CPC ............ G06K 9/00597; G06K 9/0061; G06K 9/00604; G06K 9/34; G06K 9/00281; G06T 7/0089; G06T 7/0083; G06T 7/0095; G06T 2207/30201
USPC ......... 382/117, 115, 110, 100, 190, 199, 103, 382/118, 168, 173, 181, 232, 254, 276, 309, 382/312
See application file for complete search history.

(56) References Cited

U.S. PATENT DOCUMENTS 3,069,654 A 12/1962 Hough
4,641,349 A 2/1987 Flom et al.
(Continued)

FOREIGN PATENT DOCUMENTS

WO 2008091278 A2 7/2008

OTHER PUBLICATIONS

Notification of Transmittal of the International Search Report and the Written Opinion of the International Searching Authority, or the Declaration, mailed Jul. 17, 2008 for International Application No. PCT/US07/14867, 8 pages.
(Continued)

*Primary Examiner* — Sheela C Chawan
(74) *Attorney, Agent, or Firm* — Fish & Richardson P.C.

(57) ABSTRACT

A process for extracting iris data for biometric identification includes a thresholding method where the thresholds are selected according to a nonparametric approach that considers the grey scale and does not require classifying pixels as edge or non-edge pixels. An eye image is first acquired, where the eye image has component images including an iris image with an inner boundary and an outer boundary. The eye image has a distribution of grey levels. Component images, such as an iris image or a pupil image, from the eye image are segmented according to the distribution of grey levels. The inner boundary and outer boundary of the iris image are determined from the component images. The iris image within the inner boundary and outer boundary is processed for biometric identification. The component images may be segmented by creating an eye histogram of pixel intensities from the distribution of grey levels.

10 Claims, 7 Drawing Sheets

(56) References Cited

U.S. PATENT DOCUMENTS

| | | | |
|---|---|---|---|
| 5,291,560 | A | 3/1994 | Daugman |
| 5,481,622 | A | 1/1996 | Gerhardt et al. |
| 5,572,596 | A | 11/1996 | Wildes et al. |
| 5,751,836 | A | 5/1998 | Wildes et al. |
| 5,859,686 | A | 1/1999 | Aboutalib et al. |
| 5,953,440 | A | 9/1999 | Zhang et al. |
| 6,144,754 | A | 11/2000 | Okano et al. |
| 6,152,563 | A | 11/2000 | Hutchinson et al. |
| 6,215,891 | B1 | 4/2001 | Suzaki et al. |
| 6,229,907 | B1 | 5/2001 | Okano et al. |
| 6,247,813 | B1 | 6/2001 | Kim et al. |
| 6,285,780 | B1 | 9/2001 | Yamakita et al. |
| 6,373,968 | B2 | 4/2002 | Okano et al. |
| 6,419,638 | B1 | 7/2002 | Hay et al. |
| 6,526,160 | B1 | 2/2003 | Ito |
| 6,532,298 | B1 | 3/2003 | Cambier et al. |
| 6,542,624 | B1 | 4/2003 | Oda |
| 6,546,121 | B1 | 4/2003 | Oda |
| 6,571,002 | B1 | 5/2003 | Ogawa |
| 6,591,064 | B2 | 7/2003 | Higashiyama et al. |
| 6,597,377 | B1 | 7/2003 | MacPhail |
| 6,614,919 | B1 | 9/2003 | Suzaki et al. |
| 6,700,998 | B1 | 3/2004 | Murata |
| 6,714,665 | B1 | 3/2004 | Hanna et al. |
| 6,753,919 | B1 | 6/2004 | Daugman |
| 6,760,467 | B1 | 7/2004 | Min et al. |
| 6,785,406 | B1 | 8/2004 | Kamada |
| 6,850,631 | B1 | 2/2005 | Oda et al. |
| 6,944,318 | B1 | 9/2005 | Takata et al. |
| 6,992,717 | B2 | 1/2006 | Hatano |
| 7,099,495 | B2 | 8/2006 | Kodno et al. |
| 7,155,035 | B2 | 12/2006 | Kondo et al. |
| 7,197,166 | B2 | 3/2007 | Jeng |
| 7,277,561 | B2 | 10/2007 | Shin |
| 7,298,874 | B2 | 11/2007 | Cho |
| 7,583,823 | B2 | 9/2009 | Jones et al. |
| 7,593,550 | B2 | 9/2009 | Hamza |
| 7,756,301 | B2 | 7/2010 | Hamza |
| 7,970,179 | B2 * | 6/2011 | Tosa ............................ 382/117 |
| 8,340,364 | B2 * | 12/2012 | Tosa ............................ 382/117 |
| 2001/0017935 | A1 | 8/2001 | Suzaki et al. |
| 2003/0012413 | A1 | 1/2003 | Kusakari et al. |
| 2003/0058405 | A1 | 3/2003 | Cornsweet et al. |
| 2004/0197011 | A1 | 10/2004 | Camus et al. |
| 2006/0008124 | A1 | 1/2006 | Ewe et al. |
| 2006/0147094 | A1 | 7/2006 | Yoo |
| 2006/0165266 | A1 | 7/2006 | Hamza |
| 2007/0036397 | A1 | 2/2007 | Hamza |
| 2007/0047772 | A1 | 3/2007 | Matey et al. |
| 2007/0047773 | A1 | 3/2007 | Martin et al. |
| 2007/0110284 | A1 | 5/2007 | Rieul et al. |
| 2007/0160266 | A1 | 7/2007 | Jones et al. |
| 2007/0160267 | A1 | 7/2007 | Jones et al. |
| 2013/0182953 | A1 | 7/2013 | Tosa |

OTHER PUBLICATIONS

Y. Park, et al.; "A Fast Circular Edge Detector for the Iris Region Segmentation", S.-W. Lee, H.H. Buelthoff, T. Poggio (Eds.) BMCV 2000, LNCS 1811, pp. 417-423, 2000.

Christel-Loic Tisse, et al. "Person identification technique using human iris recognition", Advanced System Technology; Universite de Montpellier.

Libor Masek; "Recognition of Human Iris Patterns for Biometric Identification"; School of Computer Science and Software Engineering, The University of Western Australia, 2003. pp. 1-56.

Xiaomei Liu, et al.; "Experiments with an Improved Iris Segmentation Algorithm", Department of Computer Science and Engineering University of Notre Dame; Fourth IEEE Workshop on Automatic Identification Advanced Technologies (AutoID), Oct. 2005, New York; 6 pages.

Ping-Sung Liao, et al.; "A Fast Algorithm for Multilevel Thresholding", Journal of Information Science and Engineering 17, 713-727 (2001).

Nobuyuki Otsu "A Threshold Selection Method from Gray-Level Histograms", IEEE Transactions on Systems Man and Cybernetics, vol. SMC-9, No. I, Jan. 1979.

* cited by examiner

IRIS DATA EXTRACTION

CROSS-REFERENCE TO RELATED APPLICATIONS

This application is a continuation of and claims the benefit of priority under 35 U.S.C. §120 to U.S. application Ser. No. 13/723,711, filed Dec. 21, 2012, now abandoned, which is a continuation of U.S. application Ser. No. 13/096,401, filed Apr. 28, 2011, which issued as U.S. Pat. No. 8,340,364, on Dec. 25, 2012, which is a division of U.S. application Ser. No. 11/526,096, filed Sep. 25, 2006, which issued as U.S. Pat. No. 7,970,179 on Jun. 28, 2011, the entire contents of all of which are hereby fully incorporated by reference.

BACKGROUND OF THE INVENTION

1. Field of the Invention

The present invention relates to biometric identification using an iris image, and more particularly, to identification of the iris image in an eye image for extracting iris data.

2. Description of Related Art

Due to the unique character of each individual's iris, various systems attempt to use the iris for biometric identification. Such systems generally capture an image of the entire eye, which includes an image of the iris. The iris image must be identified before the patterns of the iris, which are unique to each individual, can be extracted for biometric analysis. In other words, the area that corresponds to the iris must be segmented, or separated, from the other components in the entire eye image. Conventional systems generally determine the boundaries of the iris image by searching for the edges that correspond with these boundaries. In particular, these conventional approaches depend on the contrast between the edges and the area around the edges, referred to as edge strength, to identify the boundaries. As described further below, this approach suffers from many disadvantages and fails to provide a robust method for finding and extracting iris data. For instance, because the edges between the iris and the sclera (limbic boundary) are often weak and hard to detect, conventional systems are beset with the difficult challenge of enhancing the weak edges to identify the iris boundaries adequately.

U.S. Pat. No. 5,291,560 to Daugman implements an integro-differential operator for locating the circular edges of the iris and pupil regions, as well as edges of the arcs of the upper and lower eyelids. As a first step, Daugman approximates the edge of the pupil to be a circle and sums the brightness along each circle with trial center coordinates $(x_0, y_0)$ and incrementally increasing radius r. When radius r reaches the edge of the pupil, there is a sudden change in the brightness since the brightness of pixels in the pupil region should be different from pixels in the iris region just outside the pupil region. Various trial center coordinates $(x_0, y_0)$ can be evaluated to find the center of the pupil. If the center coordinates $(x_0, y_0)$ do not coincide with the pupil's center, some portions of the circle will still lie within the pupil region when the brightness suddenly changes. However, if the center coordinates $(x_0, y_0)$ do indeed coincide with the pupil's center, when the brightness suddenly changes, no portions of the circle should be in the pupil region, so the rate-of-change of the brightness, or luminance, should be at its maximum. Thus, the problem of locating the pupil's boundary is reduced to an optimization problem where a three-parameter space is searched for the best combination of center coordinates $(x_0, y_0)$ and radius r, i.e., where the absolute value of the partial derivative with respect to radius r of the integrated luminance along the circle is maximum. The search of the three-parameter space can occur in an iterative process of gradient-ascent.

As a second step, Daugman's approach for finding the outer edge of the iris, also known as the limbic boundary, is similar to finding the edge of the pupil but the previous approach is modified to account for the fact that i) the pupil is not always centered in the iris, ii) the upper and lower eyelids obscure top and bottom portions of the iris, and iii) the iris, unlike the pupil, has a concentric texture and may itself contain interior circular edges which could create sudden changes in integrated luminance along a circle. The process for detecting the iris edge therefore is restricted to two 45-degree arcs along the horizontal meridian and an area integral is used rather than a contour integral. The luminance for arcs of increasing radius and centered at the pupil center are evaluated as an area integral in polar coordinates. The value of radius r which corresponds to the maximum in the rate-of-change of integrated luminance with respect to radius r corresponds to an edge of the iris. This calculation is made for each arc separately since the left and right edges of the iris may be at different distances, i.e. radius r, from the pupil's center.

Disadvantageously, as Daugman acknowledges by using area integrals when processing the iris image, the algorithm can fail because it is susceptible to changes in luminance that do not occur at the boundaries, such as those caused by reflections, noise from a poor image, contact lens edges, or even by actual features or textures in the eye. In particular, the use of integro-differential operators are sensitive to the specular spot reflection of non-diffused artificial light that can occur inside the pupil, and such spots can cause the detection of the correct inner boundary to fail. Therefore, Daugman has also proposed the use of Gaussian filtering to smooth the texture patterns inside the iris region to avoid incorrect detection of false limbic boundaries, but this approach involves heavy computational complexity.

In addition, the process above must be modified to account for the fact that the edges are not clean edges and are somewhat fuzzy. The integrated luminance of a shell sum must be used rather than the integrated luminance of the circle, i.e. the rate-of-change of a shell sum is maximized. Therefore, use of the Daugman may require ad hoc adjustments of the shell size parameter.

U.S. Pat. Nos. 5,751,836 and 5,752,596 to Wildes et al. also implement edge detection algorithms. The process disclosed by Wildes et al. initially averages and reduces the input image using a low-pass Gaussian filter that spatially averages and reduces high frequency noise. The result is then subsampled without further loss of information but with the advantage of reducing computational demands. The iris is then localized by locating the limbic (outer) boundary of the iris, the pupillary (inner) boundary of the iris, and the eyelid boundaries. The iris is then taken as the portion of the image that is outside the pupillary boundary, inside the limbic boundary, above the lower eyelid, and below the upper eyelid.

The first step in locating each component of the iris boundary employs a gradient-based edge detection operation which forms an edge map by calculating the first derivatives of intensity values and then thresholding the result. Wildes et al. bias the derivatives in the horizontal direction for detecting the eyelids, and in the vertical direction for detecting the limbic boundary. The application of the process taught by Wildes et al. has the disadvantage of requiring threshold values to be chosen for edge detection. Poor choice of threshold values can eliminate critical edge points possibly causing failure in the detection of the circles and arcs making up the boundaries of the iris.

Using the resulting edge map, the second step employs a transform like that generally disclosed in U.S. Pat. No. 3,069,654 to Hough. The limbic boundary is modeled as a circle with center coordinates $(x_0, y_0)$ and radius r. Thus, the detected edge pixels from the edge map are thinned to increase the number of meaningful edges. The pixels are then histogrammed into a three-dimensional space formed by circle parameters $x_0$, $y_0$, and r (Hough circle transform). The $(x_0, y_0, r)$ point with the most number of votes from the histogramming process then represents the limbic boundary. Similarly, the pupil is also modeled as a circle and the edge pixels are thinned and histogrammed into $(x_0, y_0, r)$ values, where the $(x_0, y_0, r)$ point with the most votes are taken to represent the pupillary boundary. The eyelid boundaries, however, are modeled as two separate parabolic arcs. The eyelid edges are thinned and histogrammed according to the parameters necessary to define a parabolic arc (parabolic Hough transform), where the set of parameters with the most votes is taken to represent the upper or lower eyelids.

In the article titled "Recognition of Human Iris Patterns for Biometric Identification" by Libor Masek, the Hough circle transform is also used, but unlike Wildes et al., Masek first employs Canny edge detection to create the edge map. Masek modifies Kovesi's Canny edge detection to allow for the weighting of gradients as Wildes et al. teaches for the detection of the limbic boundary with a vertical bias. The Hough circle transform is applied to find the limbic boundary first and then the pupillary boundary where the range of radius values for the search is set manually depending on the database used and the typical radius values in the images.

With respect to the eyelids, Masek applies Canny edge detection where only horizontal gradient information is taken. The eyelids are then located by fitting a line to the upper and lower eyelids through a linear Hough transform. A second horizontal line is formed from the intersection of the fitted line and the limbic boundary closest to the pupil in order to achieve maximum isolation of the eyelids. The use of the linear Hough transform is less computationally demanding than the use of the parabolic Hough transforms taught by Wildes et al. However, maximum isolation of the eyelid regions can isolate substantial portions of the iris itself and make the matching process less accurate.

Disadvantageously, Masek requires threshold values to be specified to create the edge maps, and as with Wildes et al., these threshold values are dependent on the database and the quality of images in the database. Poor choice of threshold values can eliminate critical edge points possibly causing failure in the detection of the circles and arcs making up the boundaries of the iris.

In "Experiments with an Improved Iris Segmentation Algorithm" (Fourth IEEE Workshop on Automatic Identification Advanced Technologies (AutoID), October 2005, New York), Lui et al. disclose a process known as ND_IRIS, which attempts to improve Masek's approach toward segmentation. Masek's method detects the outer iris boundary first and then detects the inner boundary within the outer boundary, but Lui et al. reverses this order by detecting the inner boundary first since there is often greater contrast between the pupil and iris, and thus the inner boundary can be easier to localize. Lui at al. also point out that edge pixels that do not lie on the iris boundary often cause the Hough transform to find an incorrect boundary. Thus, edges within the pupil and the iris are further reduced through thresholding before Canny edge detection. In addition, Lui et al. modifies the Hough transform and implements a verification step which compares the areas on both sides of a proposed boundary. Also, each eyelid is modeled as two straight lines rather than just one. Despite improved iris segmentation, ND_IRIS, like the Masek approach, fails particularly when the image quality is low. Published results also suggest that ND_IRIS problematically has higher recognition rates for light iris images than for dark iris images.

The conventional processes above are not robust because they all require searching for parameters that define the shapes that approximate the iris boundaries. Daugman searches for the best combination of center coordinates ($x_0$, $y_0$) and radius r to define a pupil circle and arcs that mark the left and right edges of the iris. Meanwhile, Wildes et al. applies the circle and parabolic Hough transforms which creates a histogram in to a parametric-space, e.g. a three-dimensional $(x_0, y_0, r)$ space for the circle Hough transform, to define circular and parabolic shaped boundaries of the iris. Similarly, Masek applies circle and linear Hough transforms.

In addition, approaches that rely on edge strength to detect eye components may require the use of a edge strength threshold. Generally, the edge strength threshold must be determined adaptively at a high computational cost. If the selected edge strength is too high, only the edges from the eyelids and eyelashes can be identified. On the other hand, if the selected edge strength is too low, too many edges are identified for analysis. As a result, a fourth parameter corresponding to the threshold for edge strength, in addition to x, y positions and radii, must be searched. The edge strength threshold is determined iteratively by processing the database of captured images. If the camera settings or lighting conditions change, however, a new edge strength threshold must be recalculated by iteratively processing the database of images captured under the new camera settings or lighting conditions. As such, the need to recalculate parameters every time conditions change makes the conventional edge-detection systems above less robust.

In addition, the processes above can be highly dependent on the quality of the images being analyzed. For instance, Daugman requires a shell size parameter to be adjusted while Wildes et al. and Masek require threshold values to be chosen for edge detection.

Furthermore, because techniques, such as those taught by Daugman and Wildes et al., identify edges by analyzing localized areas of the image in an incremental manner, the techniques are computationally costly if the approximate location of the iris is not known. As such, a full search along the x- and y-axes as well as the radii for the entire image may be required.

In "Efficient iris recognition by characterizing key local variation" (*IEEE Transactions on Image Procession*, vol. 13, no. 6, 739-50, 2004), Ma et al. attempt to lower the computational cost by using a "global" projection along the x- and y-axes to find the minima position as the approximate position of the iris. A narrower region, e.g. 120×120, centered on the point is then binarized to a reasonable threshold using the grey level histogram twice to find the center. The lighting of the iris, however, usually creates a bright spot of spots inside the pupil, and results in the minima of the xy projection to be at the wrong location.

Despite the disadvantages of the approaches described above, current attempts to improve segmentation continue to focus exclusively on analyzing edges particularly through parametric approaches, namely the methods used by Daugman and Masek. As described above, Lui et al. uses a segmentation approach based on Masek. In addition, in the article "Person identification technique using human iris recognition," Tisse et al. implement an improved system based on the integro-differential operators as taught by Daugman in combination with a Hough transform. Moreover, in "A Fast Circular Edge Detector for the Iris Region Segmentation" (Biolgically Motivated Computer Visio: First IEEE International Workshop, Seoul, Korea, May 15-17, 2000), Park et al. propose using a method based on Daugman where the need for Gaussian filtering proposed by Daugman is eliminated by searching from a radius r that is independent of the texture patterns in the iris to find the limbic boundary.

SUMMARY OF THE INVENTION

To avoid the problems of the conventional edge-detection approaches described above, the present invention implements a thresholding method where the thresholds are selected according to a nonparametric approach that considers the grey scale and does not require classifying pixels as edge or non-edge pixels.

Accordingly, an embodiment of the present invention provides a method for extracting iris data from an eye for biometric identification. An eye image is first acquired, where the eye image has a plurality of component images including an iris image with an inner boundary and an outer boundary. Moreover, the eye image has a distribution of grey levels. Component images, such as an iris image or a pupil image, from the eye image are segmented according to the distribution of grey levels. The inner boundary and outer boundary of the iris image are determined from the component images. The iris image within the inner boundary and outer boundary are then processed.

In particular, the component images may be segmented by creating an eye histogram of pixel intensities from the distribution of grey levels of the eye image, where the eye histogram has classes, each of which corresponds to one of the component images. Thresholds in the eye histogram are selected to divide the classes of the eye histogram. The thresholds may be selected by maximizing between-class variances, which may include retrieving results for pre-computed arithmetic calculations from a look-up table. Thresholded images corresponding to each of the classes are then created.

These and other aspects of the present invention will become more apparent from the following detailed description of the preferred embodiments of the present invention when viewed in conjunction with the accompanying drawings.

DETAILED DESCRIPTION

Figure 1:
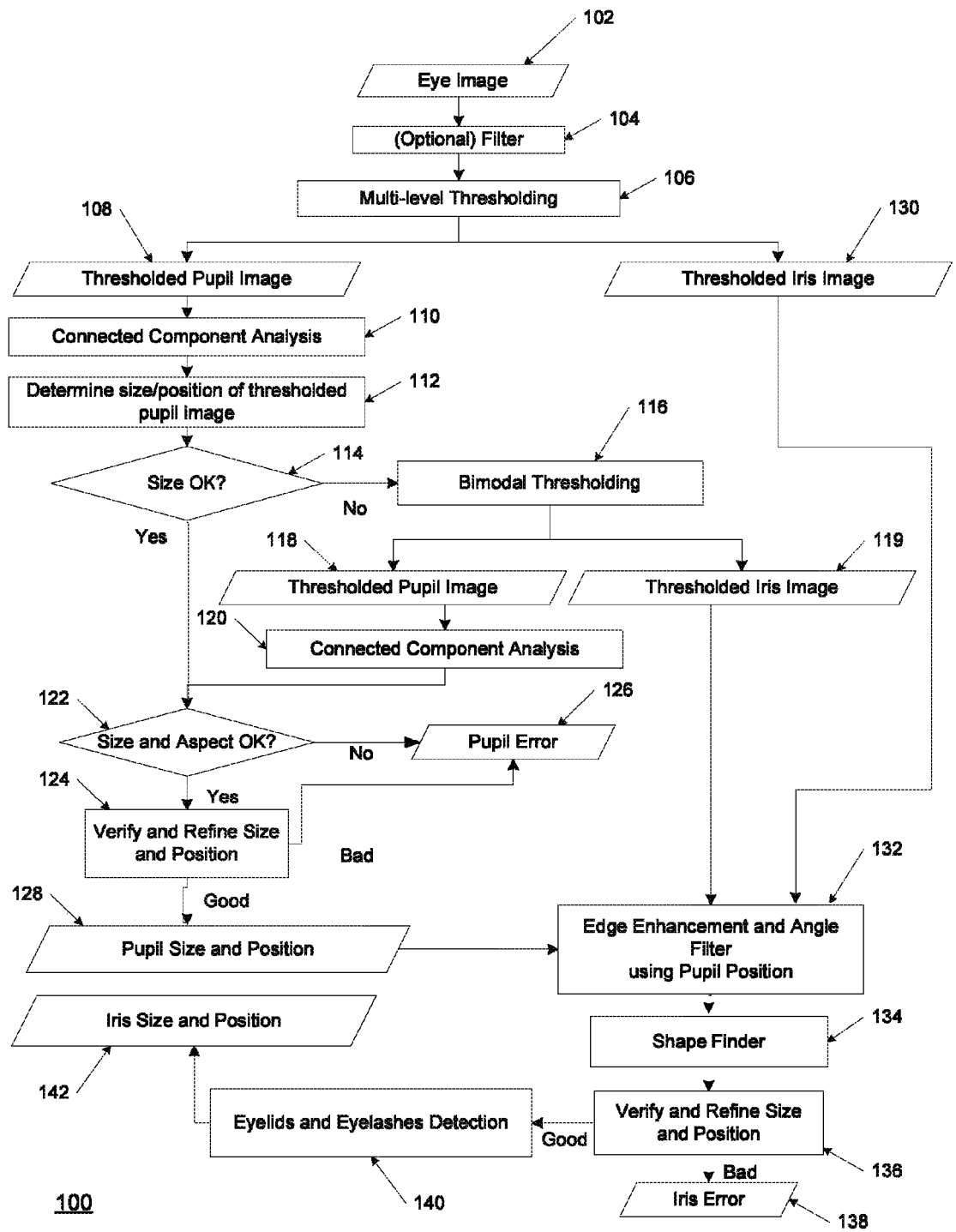
FIG. 1 illustrates the steps in an exemplary method for applying multi-level thresholding to determine the size and position of the iris image to enable extraction of iris data.

The present invention implements a thresholding method where the thresholds are selected according to a nonparametric approach that considers the grey scale and does not require classifying pixels as edge or non-edge pixels.

Unlike systems relying on an edge strength threshold to identify eye components in an image, the present invention avoids the need to process iteratively all images in the database for each set of image capture conditions in order to determine an edge strength threshold. In one aspect of the present invention, the grey scale for each individual image is sufficient to identify the iris in the particular image. There is no need to process a series of captured images to preselect edge strength thresholds required to find the edges in the conventional edge-detection systems. Moreover, the conditions for image capturing do not need to remain static.

In addition, unlike the "local" edge based methods of the iris employed by the conventional approaches, the present invention considers information from the entire image in a "global" manner. In other words, the present invention uses a grey scale histogram of the entire image, rather than information about edges in a localized area of the image. As a result, the location of the pupil and iris is identified at once.

It has been discovered that the iris image in a captured eye image can be identified by employing a modified version of Otsu's threshold selection method conceived by Liao et al. In "A Threshold Selection Method from Grey-Level Histograms" (*IEEE Transactions on Systems, Man, and Cybernetics*, vol. SMC-9, No. 1, January 1979), Otsu uses a nonparametric and unsupervised method of automatic threshold selection for picture segmentation. An optimal threshold or set of thresholds is selected from a grey level histogram using discriminant analysis, i.e. by maximizing the between-class variance. Otsu's method is considered one of the better threshold selection methods for general real world images with regard to uniformity and shape measures. However, Otsu requires an exhaustive search to evaluate the criterion for maximizing the between-class variance, and the method requires too much time to be practical for selecting multiple threshold levels. Thus, in "A Fast Algorithm for Multilevel Thresholding" (*Journal of Information Science and Engineering* 17, 713-727 (2001)), Liao et al. propose a faster, more efficient version of Otsu's method. In particular, Liao et al. proposes a criterion for maximizing a modified between-class variance that is equivalent to the criterion of maximizing the between-class variance taught by Otsu's method. Using the new criterion of Liao et al., a recursive algorithm is then employed to efficiently find the optimal threshold. The modified between-class variance can be pre-computed and stored in a lookup table. Thus, the method of Liao et al. is more efficient because the new criterion requires fewer computations and the lookup table eliminates the need to repeat arithmetic operations.

Accordingly, FIG. 1 illustrates an exemplary embodiment 100 of the present invention which employs a thresholding technique, such as that taught by Liao et al. Initially, an eye image 102, particularly a digital image, is acquired. Preferably, the image of the eye is taken under near-infrared light in order to enhance the pattern of the iris. The eye image can be obtained by various techniques known to those of skill in the art, and thus, the details are omitted. In general, the eye image should have an even contrast across the entire eye.

Figure 2:
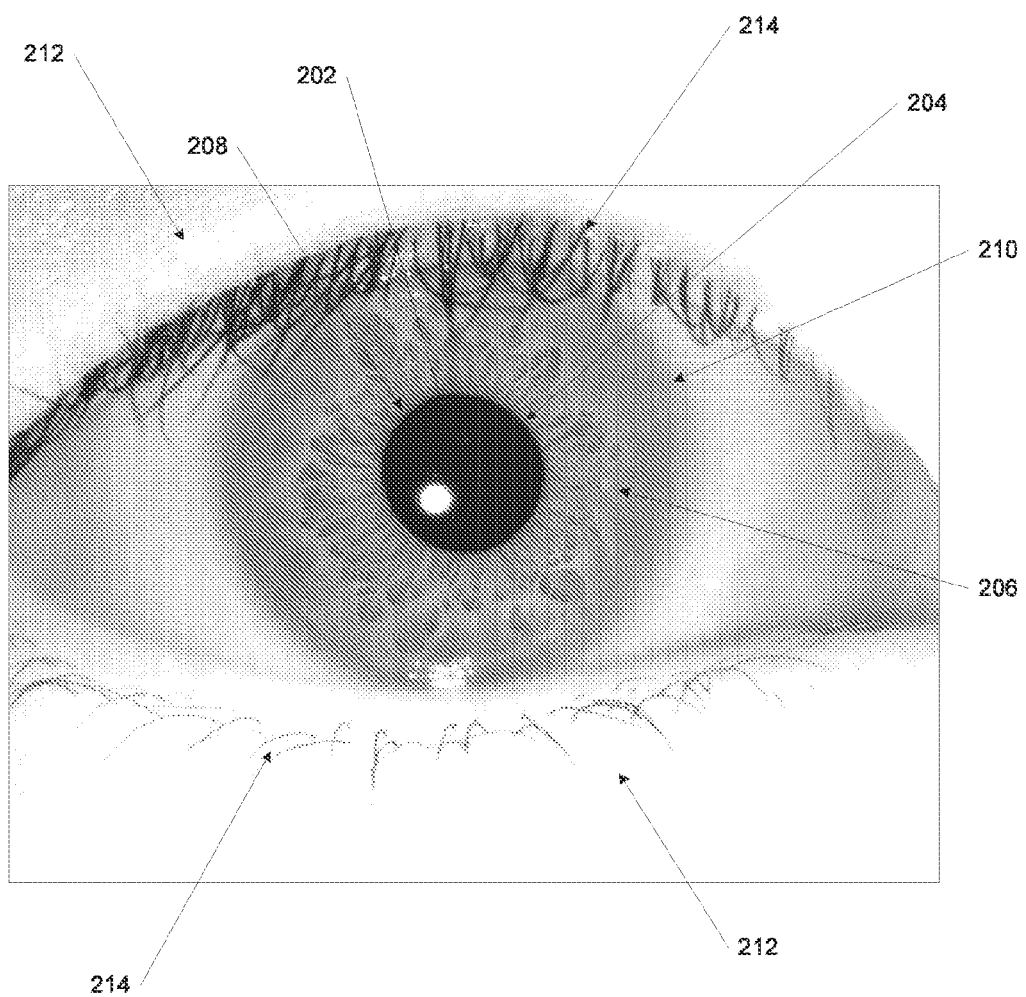
FIG. 2 illustrates an example of a captured eye image.

As shown in FIG. 2, the eye image 200 has a plurality of component images including a pupil image 202, an iris image 206, an eyelids image 212, and an eyelashes image 214. The pupil image 202 has a boundary 204, while the iris image 206 has an inner boundary 208 and outer boundary 210. In general, the outer boundary 204 of the pupil image coincides with the inner boundary 208 of the iris image 206. Moreover, as further illustrated in FIG. 2, the eye has a distribution of grey levels.

Figure 5A:
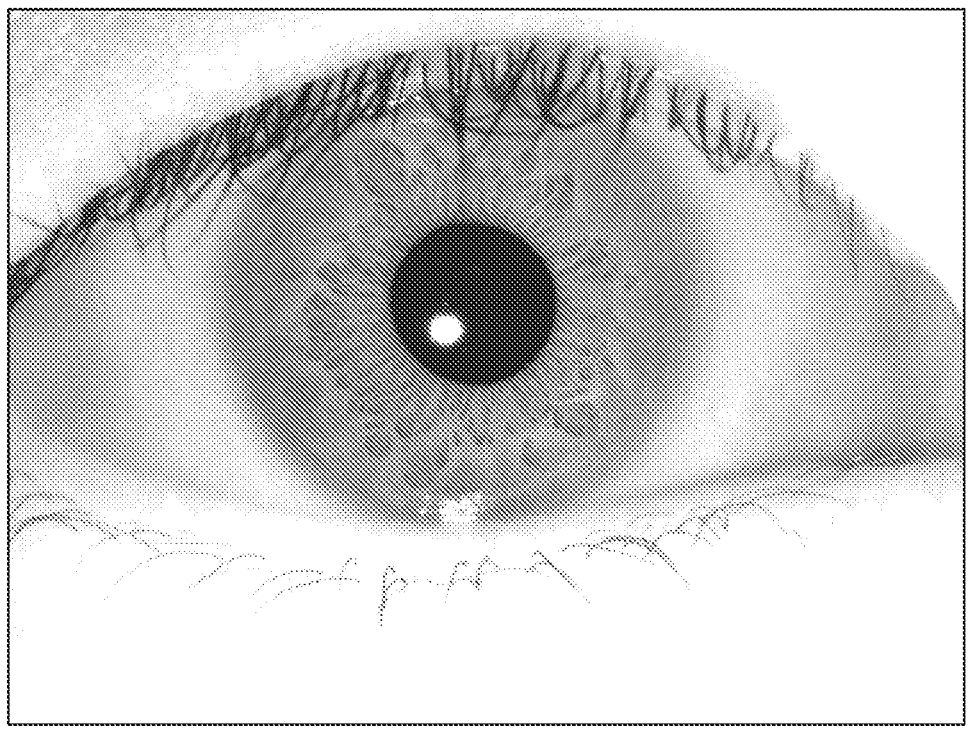
FIG. 5A illustrates an example of a digitally captured eye image.
Figure 5B:
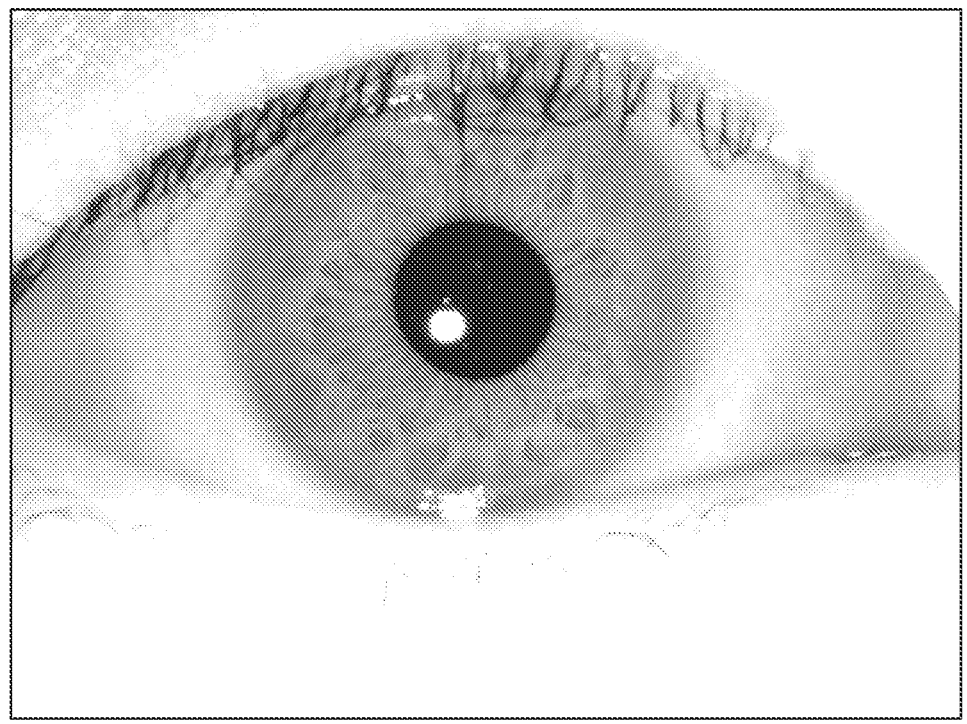
FIG. 5B illustrates the eye image of FIG. 5A after the application of a max-filter.

In step 104, an optional filter may be applied to the captured eye image 200. In particular, a conventional max-filter, which reduces pepper noise, can be applied to the image to lessen the effect of the eyelashes image 214, which are generally thin and darker than the eyelids. FIG. 5A shows an example of a digitally captured eye image, and FIG. 5B shows the image of FIG. 5A after the application of a max-filter. However, as described below, the present invention, when compared to conventional approaches, is less sensitive to noise, such as noise created by eyelashes.

Figure 3:
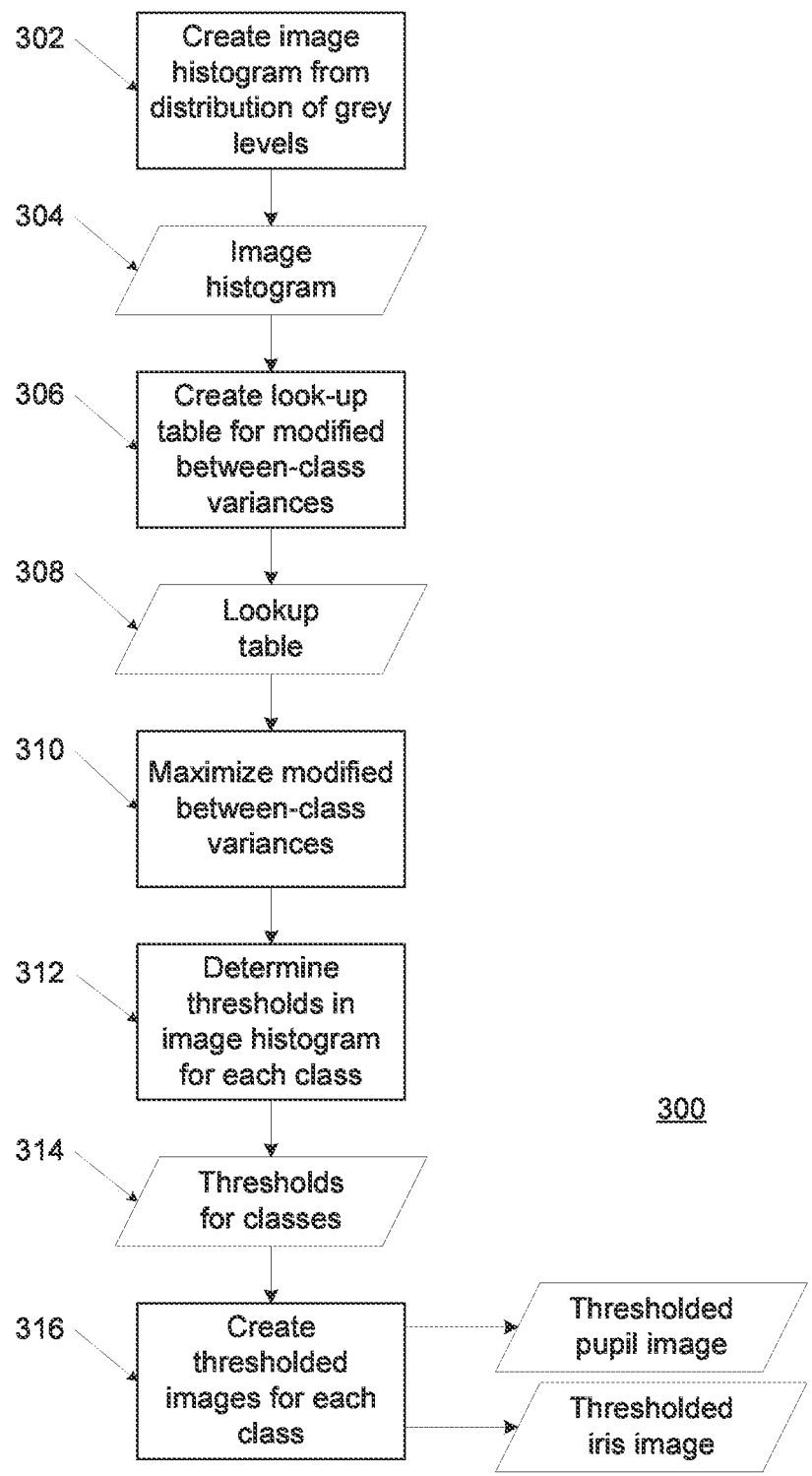
FIG. 3 illustrates an exemplary method for applying multi-level thresholding to create thresholded images of components in the eye image.

In step 106, the component images of the eye image are identified according to the distribution of grey levels in the process known as multi-level thresholding. FIG. 3 illustrates an exemplary embodiment 300 of the multi-level thresholding of step 106. In particular, Liao et al.'s modified version of Otsu's method may be applied to process the pixels, or basic units, of the eye image and determine multiple threshold levels. In step 302, an eye histogram 304 of pixel intensities is created from the distribution of grey levels in the eye image. The eye histogram has classes that each correspond to one of the component images in the eye image. In step 306, the modified between-class variance as taught by Liao et al. can be pre-computed and stored in a lookup table 308 to reduce computational expense. In step 310, the modified between-class variance is maximized, and in step 312, the thresholds 314 corresponding to the classes of the eye histogram 304 are determined. In particular, a recursive algorithm as taught by Liao et al. is employed to efficiently find the optimal thresholds 312. Thus, components of the eye image are identified according to the calculated thresholds 314. Preferably, at least three threshold levels are calculated in order to identify the pupil and iris components of the eye image, but additional threshold levels may be employed to provide more refined segmentation and to further eliminate parts of the eye image that do not correspond with the pupil and iris. In particular, the exemplary embodiment of the present invention described herein employs four thresholds. Once the threshold levels identify the pupil and iris components of the eye image, the remaining components of the image can be discarded.

Figure 4:
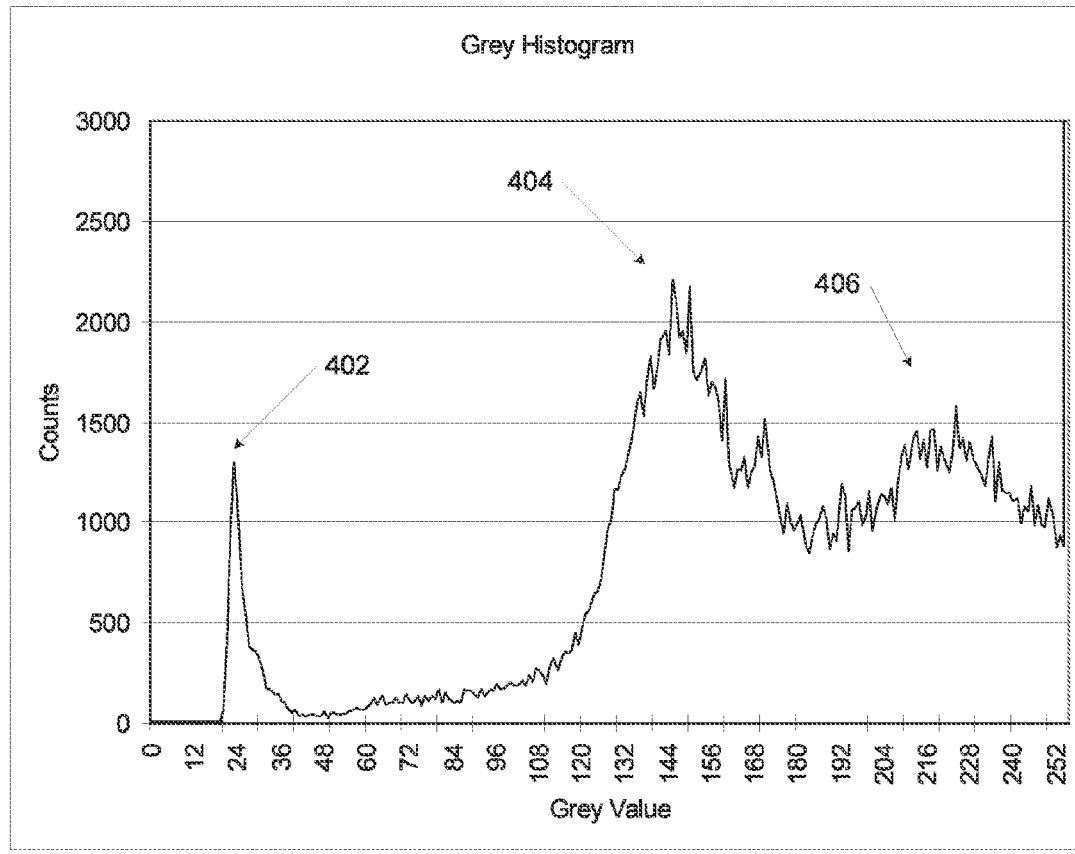
FIG. 4 illustrates an example of an eye histogram.

As illustrated in FIG. 4, the example histogram 400 for an eye image reveals several peaks. The iris image generally has higher grey values than the pupil image, and the sclera image generally has higher grey values than the iris image. Thus, referring to FIG. 4, the first peak 402 corresponds to the pupil, the second peak 404 corresponds to the iris, and subsequent peaks 406 correspond to the sclera and other parts of the eye image. The selected thresholds 312 correspond to these identifiable peaks in the histogram 304.

Figure 5C:
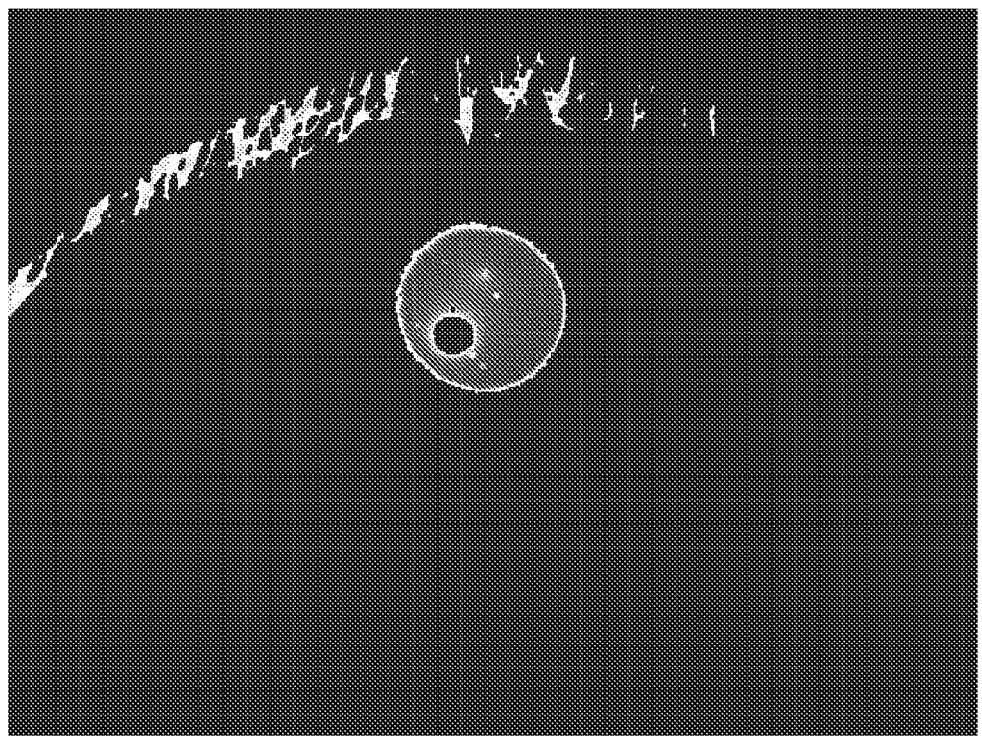
FIG. 5C illustrates the thresholded pupil image after multi-level thresholding has been executed for the eye image of FIG. 5B.
Figure 5D:
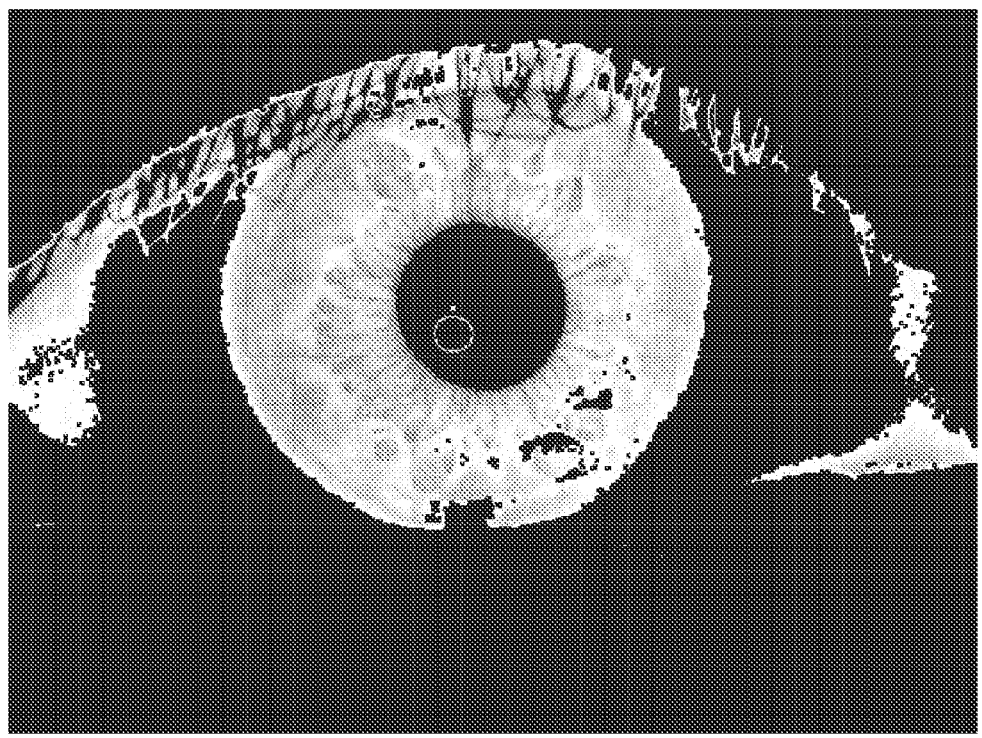
FIG. 5D illustrates the thresholded iris image after the multi-level thresholding has been executed for the eye image of FIG. 5B.

As further shown in FIG. 3, a thresholded image corresponding to each of the classes, or component images, is then created in step 314. In particular, as shown in FIG. 1, step 106 produces a thresholded pupil image 108 and a thresholded iris image 130 corresponding to the pupil image and the iris image, respectively. FIGS. 5C and 5D illustrate the thresholded pupil and iris images, respectively, after the multi-level thresholding method of step 106 is executed. The thresholded pupil image is used to find the inner (pupillary) boundary of the iris image. With the further detection of the outer edge from the thresholded iris image 130, the inner and the outer boundaries indicate the region from which iris biometric data can be obtained.

The present invention is robust because it is not necessary to search for parameters as required in the conventional approaches. As described previously, the present algorithm is dynamic and adjusts itself to varying light conditions. In addition, the use of the present invention does not depend on the database and the typical characteristics of the images in the database, unlike the approach of Wildes et al. or Canny edge detection where thresholds must be specified according to the quality of the images in the particular database.

Moreover, a notable advantage to Otsu's method is that the thresholds are not selected according to differentiation but according to integration of the histogram. Contrary to the differentiation approach of Daugman which looks for a local property, i.e. a change in luminance, Otsu's method is a global approach based on the grey level histogram reflecting the entire image. Thus, the present invention is not sensitive to localized noise or imperfections in the image. For instance, edge based algorithms fail when edges from a contact lens are present in the image. Such algorithms cannot differentiate between the edge of a contact lens and the boundary of the iris. The present invention ignores the presence of edges in favor of detecting grey scale objects which correspond to parts of the eye.

Although the multi-level thresholding of step 106 employs a threshold aimed at identifying the pupil image, the thresholded pupil image may contain pixels which do not represent the pupil image. As illustrated in FIG. 5B, extraneous parts of the image, such as parts of the eyelash and eyelid images, may fall within the threshold that corresponds with the pupil and become a part of the thresholded image. Therefore, referring to FIG. 1, a process such as grey level connected component analysis is applied, in step 110, to determine the pixels corresponding to the pupil image and separate a clean shape for the pupil from these extraneous parts.

Once the thresholded pupil image is processed using connected component analysis, a simple min-max method can be applied to the area, in step 112, to identify the center of the pupil and the size of the pupil. Alternatively, a circular or elliptical Hough transform can also be applied to get pupil's size and center.

The pupil aspect and size are evaluated in step 114. In particular, the edges may be tested for circularity. For instance, circularity may be tested by applying Freeman chain coding analysis, as described by H. Freeman in "Boundary encoding and processing," *Picture Processing and Psychopictorics*, B. Lipkin and A. Rosenfeld, eds., Academic Press, Inc, New York, 1970, pp. 241-266. If the thresholded pupil image appears to have the proper aspect and size, the process proceeds to step 122. In most cases, improper pupil aspect and size occur when the thresholded pupil image also includes an iris image, which causes the calculated size to be too large. This may occur if the grey level values for the pixels corresponding to the pupil and the iris are too close to enable the multi-level thresholding step 106 to separate the iris image from the pupil image in the thresholded pupil image. As a result, the thresholded pupil image must be further processed in step 116 to segment the pupil and iris images.

In particular, step 116 applies bimodal thresholding to the thresholded pupil image. The steps illustrated in FIG. 3 are applied in step 116, using only two classes—one for each of the pupil image and the iris image—unlike the step 106 where more than two classes are preferably used. As shown in step 302, a pupil histogram 304 of pixel intensities is created from a distribution of grey levels in the thresholded pupil image. In step 306, the modified between-class variances according to the method of Liao et al. are calculated and stored in a lookup table 308 to make arithmetic operations more efficient. In step 310, the modified between-class variance is maximized, and in step 312, the thresholds 314 corresponding to the two classes in the eye histogram 304 are determined. Thus, the pupil and iris images of the eye image are identified according to the calculated thresholds 314. Because the initial thresholded pupil image 108 in this case contains both a pupil image and iris image, applying bimodal thresholding to the thresholded pupil image yields a new thresholded pupil image 118 in addition to a new thresholded iris image 119.

Referring again to FIG. 1, the thresholded pupil image 118 from step 116 may be processed again in step 120 with grey level connected component analysis. Meanwhile, the thresholded iris image 119 serves as input to step 132, which is discussed in further detail below. It should be noted that if the thresholded pupil image 108 includes pixels that correspond to the iris image, these pixels will not be included thresholded iris image 130 that result from the multi-level thresholding step 106. As a result, the thresholded iris image 119 is necessary for processing of the iris image.

As described above, the connected component analysis in step 120 allows pixels representing non-pupil components in the thresholded image to be separated from pixels representing the pupil, further separating a clean shape for the pupil from any extraneous parts.

The thresholded pupil image is evaluated again in step 122 to determine whether the size and aspect of the thresholded pupil image falls within an acceptable range. As described above, the edges may be tested for circularity with a technique such as Freeman chain coding analysis. If the size and aspect of the image are acceptable, the size and position of the thresholded pupil image are verified and refined, in step 124. Otherwise, a "pupil error" is declared in step 126, and the captured image cannot be used to obtain biometric data.

In step 124, verifying and refining the size and position of the thresholded pupil image may employ an integro-differential method or the Hough circle method. As described previously, with an integro-differential method, the center and boundary of the pupil may be determined by searching a three-parameter space for the best combination of center coordinates $(x_0, y_0)$ and radius r, i.e., where the absolute value of the partial derivative with respect to radius r of the integrated luminance along the circle is maximum. As also described previously, with the Hough circle method, the pupil is modeled as a circle and the edge pixels are thinned and histogrammed into $(x_0, y_0, r)$ values, where the $(x_0, y_0, r)$ point with the most votes are taken to represent the pupillary boundary. Indeed, the current invention can be used as a preprocessing step for conventional methods, such as those taught by Daugman, which employs an integro-differential method, or Wildes et al., which employs the Hough circle method. Employing the global thresholding technique of the present invention, however, eliminates the need to search a large parameter space as currently required by the conventional methods that rely solely on an integro-differential method or the Hough circle method.

Alternatively, the step 124 can verify and refine the size and position of the pupil by employing a caliper tool to detect edges, although the caliper cannot be used when no approximate location is known. Another possibility for the step 124 includes employing a hill-climbing method on the edges.

The verification and refining process of step 124 produces a pupil size and position. If a result cannot be determined or if the result is not reasonable, a "pupil error" is declared in step 126, and the captured image cannot be used to obtain biometric data. Otherwise, the pupil size and position 128 are used in further processing. In particular, the outer boundary of the thresholded pupil image is used to determine the inner boundary of iris image.

As described previously with reference to FIG. 1, the multi-level thresholding in step 106 also produces a thresholded iris image 130 corresponding with the iris image. In step 132, the outer boundary of the iris image is determined by enhancing the edges of the thresholded iris image 130. As discussed previously, if the multi-level thresholding step 106 does not separate the pupil and iris images and further bimodal thresholding is required in step 116, the thresholded iris image 119, which results from step 116, is used as input for step 132 in place of thresholded image 130.

Because a thresholded iris image 130 or 119 is available, there is no need to use a computationally expensive edge operator for edge enhancement in step 132. Rather a very simple edge tool, such as the Sobel edge detector, can be used. Specifically, the Sobel edge detector is used with angle filtering which restricts the edges to those that correspond with the center of the pupil. Other possible edge tools, such as Canny, Shen-Casten, or Spacek edge detectors, can be used, but are generally more computationally expensive.

In step 134, the shape of the iris image is determined from the thresholded iris image with enhanced edges. Determining the shape of the iris may include employing one, or a combination of, an integro-differential technique for finding a circle or ellipse, a Hough method for finding a circle or ellipse, and a least squares fit of points to a circle or ellipse.

In step 136, the size and position of the iris image is verified and refined using the same approaches for the processing of the pupil image in step 124. In relation to the verification and refinement of step 136, the shape finder of step 134 can be seen as a "coarse find."

The verification and refining process of step 136 produces an iris size and position. If a result cannot be determined, an "iris error" is declared in step 138, and the captured image cannot be used to obtain biometric data. Otherwise, the thresholded iris image proceeds to the next step.

As shown in FIG. 2, the eye image 200 also includes an eyelids image. The eyelids image 212 forms a part of the outer boundary 210 of the iris image 206. Although the iris image may be occluded by eyelids or eyelashes, the present invention produces a clean shape using thresholding, which allows any edge extraction method to work. Once the edges have been identified, the boundary of the iris image may be found by a circular or elliptical Hough transform or, alternatively, a circular or elliptical hill-climbing fit routine. Thus, the present invention avoids the problem of isolating too much of the iris that can occur with Masek's method. Any pixels of the eye image which fall outside the calculated boundary of the iris image can be disregarded as another eye component, such an eyelid.

Once the eyelids and eyelashes are detected and eliminated in step 140 using the calculated outer boundary of the iris image, information about the iris size and position 142 can be applied to the original eye image to obtain biometric data from the iris.

Preferably, there is even-lighting across the eye when the image is taken so that the histogram is not affected by the pixels that are a part of the same eye component but which show different grey scales due to the different amounts of light they receive. For example, light reflecting off the nose can make one side of the eye brighter and affect analysis of the image. Such uneven lighting can be corrected by background analysis. Even with uneven lighting, the approximate positions of the pupil and iris can be identified. Therefore, the present invention may use optional shading correction to improve accuracy.

Accordingly, using these approximate positions, pixel values can be sampled from each side of the sclera to determine the level of uneven illumination and to make appropriate corrections according to known background analysis techniques (multiplicative background analysis or background subtraction method). For instance, grey scale values can be fitted between the left and right sample pixels from the sclera and applied to the entire image. The grey level average of the left and right regions of the sclera provides an estimate of the shading.

Figure 6:
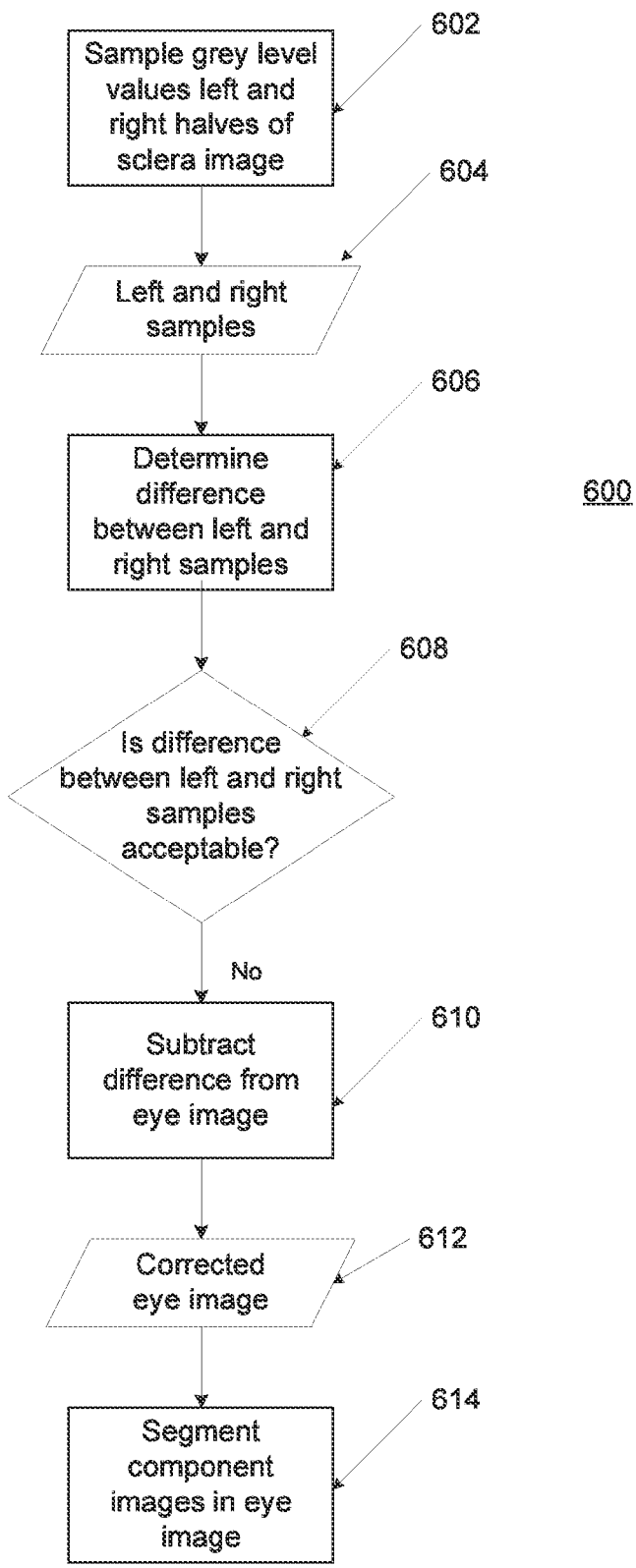
FIG. 6 illustrates an exemplary method for correcting uneven illumination in the eye image.

As illustrated in step 602 in an exemplary corrective method 600 in FIG. 6, sample grey level values 604 are sampled from the left half and the right half of the sclera image. In step 606, the difference between the left and right grey level values are determined. As indicated in step 610, if the shading estimate is found to be larger than a set threshold in step 608, the two grey scale values can be used to obtain a shading difference that can be subtracted from the eye image to get a more evenly illuminated eye image 612. Once the uneven lighting effect is corrected, image segmentation according to the present invention can be repeated in step 614 to achieve better results for locating the iris.

In addition, the present invention is not affected by the presence of a light spot reflection, which can confuse edge based algorithms which are looking for the type of brightness change or edge created by the spot reflection. A light spot reflection is insignificant when the grey scale for a larger (pupillary) area is considered. That is, usually the spot lighting will have much higher grey scale than that of the pupil. As a result, the thresholded image for the pupil excludes the light spot.

Furthermore, because the present invention uses grey scale information, it can be used to locate pupil or iris even when the edges become blurred, especially by motion.

The processing steps of the present invention may be implemented on one or more computer systems or other electronic programmable devices, programmed according to the teachings of the exemplary embodiments of the present invention. In addition, the present invention may employ computer readable media or memories for holding instructions programmed according to the teachings of the present inventions and for holding data structures, tables, records, and/or other data described herein.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A computer-implemented method for segmenting components of an eye image for creating data to be used in a system for processing eye image data, the method executed by one or more computing systems and comprising:

creating, by the one or more computing systems, an eye histogram of pixel intensities from a distribution of grey levels of an eye image, the eye histogram having two or more classes, each class corresponding to a component of the eye image;

selecting, by the one or more computing systems, thresholds in the eye histogram to divide the classes of the histogram;

creating, by the one or more computing systems, threshold images, each of the threshold images corresponding to one of the two or more classes; and removing, by the one or more computing systems, a portion of the eye image based on one or more of the threshold images.

2. The method of claim 1, wherein one of the threshold images corresponds to an eyelash image, and removing a portion of the eye image based on one or more of the threshold images comprises removing a portion of the eye image based on the threshold image corresponding to the eyelash image.

3. The method of claim 1, wherein one of the threshold images corresponds to a specular reflection image, and removing a portion of the eye image based on one or more of the threshold images comprises removing a portion of the eye image based on the threshold image corresponding to the specular reflection image.

4. The method of claim 1, wherein selecting thresholds in the eye histogram comprises determining maximum between-class variances between the two or more classes.

5. The method of claim 4, wherein determining the maximum between-class variance between the two or more the classes comprises retrieving results for arithmetic calculations from a lookup table.

6. A system comprising:

one or more processors; and a computer-readable medium coupled to at least one of the one or more processors and having instructions stored thereon which, when executed by the at least one of the one or more processors, causes at least one of the one or more processors to perform operations comprising:

creating an eye histogram of pixel intensities from a distribution of grey levels of an eye image, the eye histogram having two or more classes, each class corresponding to a component of the eye image;

selecting thresholds in the eye histogram to divide the classes of the histogram;

creating threshold images, each of the threshold images corresponding to one of the two or more classes; and removing a portion of the eye image based on one or more of the threshold images.

7. The system of claim 6, wherein one of the threshold images corresponds to an eyelash image, and removing a portion of the eye image based on one or more of the threshold images comprises removing a portion of the eye image based on the threshold image corresponding to the eyelash image.

8. The system of claim 6, wherein one of the threshold images corresponds to a specular reflection image, and removing a portion of the eye image based on one or more of the threshold images comprises removing a portion of the eye image based on the threshold image corresponding to the specular reflection image.

9. The system of claim 6, wherein selecting thresholds in the eye histogram comprises determining maximum between-class variances between the two or more classes.

10. The system of claim 9, wherein determining the maximum between-class variance between the two or more the classes comprises retrieving results for arithmetic calculations from a lookup table.

* * * * *